United States Patent [19]

Boyd et al.

[11] 4,298,250
[45] Nov. 3, 1981

[54] SOLID ELECTROCHROMIC DEVICES

[75] Inventors: Gary D. Boyd, Rumson, N.J.; Sarat K. Mohapatra, Acton, Mass.; Benjamin Tell, Matawan, N.J.; Sigurd Wagner, Evergreen, Colo.; Fred Wudl, Chester, N.J.

[73] Assignee: Bell Telephone Laboratories, Incorporated, Murray Hill, N.J.

[21] Appl. No.: 956,391

[22] Filed: Oct. 31, 1978

[51] Int. Cl.³ .............................. G02F 1/17; G02F 1/23
[52] U.S. Cl. ..................................... 350/357; 252/408
[58] Field of Search ......................... 350/257; 252/408

[56] References Cited

U.S. PATENT DOCUMENTS

| 3,521,941 | 7/1970 | Deb et al. | 350/357 |
|---|---|---|---|
| 3,827,784 | 8/1974 | Giglia et al. | 350/357 |
| 3,971,624 | 7/1976 | Druesch et al. | 350/357 |
| 3,973,829 | 8/1976 | Giglia | 350/357 |
| 3,995,943 | 12/1976 | Jasinski | 350/357 |
| 4,013,343 | 3/1977 | Jaccard et al. | 350/357 |
| 4,106,862 | 8/1978 | Bayard | 350/357 |
| 4,110,259 | 8/1978 | Sichel | 350/357 |
| 4,198,124 | 4/1980 | Cognard | 350/357 |

FOREIGN PATENT DOCUMENTS

| 51-106683 | 9/1976 | Japan | 252/408 EC |
|---|---|---|---|
| 53-11891 | 2/1978 | Japan | 350/357 |
| 589221 | 1/1978 | U.S.S.R. | 350/357 |

OTHER PUBLICATIONS

Hamblen, D. P., Research Disclosure, pp. 58–59, (Nov. 1977).
Blanc, J. et al., Physical Review B, vol. 4, No. 10, pp. 3548–3557, (Nov. 15, 1971).

Primary Examiner—Teddy S. Gron
Attorney, Agent, or Firm—Bruce S. Schneider

[57] ABSTRACT

Solid state electrochromic devices are fabricated using, as the electrochromic material, ionic conductors such as heteropoly acids. The properties of the ionic conductors permit construction of a device having only two electrodes and the electrochromic material. In operation, low voltages impressed between the electrodes induce a color change. For example, when phosphotungstic acid is employed, the color change is from white to dark blue. Cycle times as low as 100 msec are achievable and the devices exhibit memory properties.

10 Claims, 1 Drawing Figure

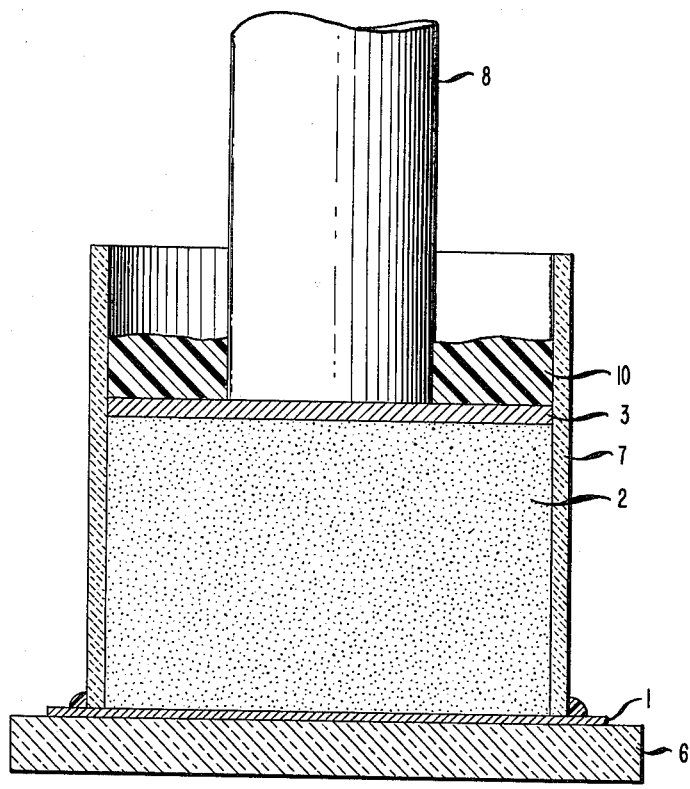

SOLID ELECTROCHROMIC DEVICES

BACKGROUND OF THE INVENTION

1. Field of the Invention

This invention relates to electrochromic devices and, more particularly, to solid state electrochromic devices.

2. Art Background

Electrochromics have potentially significant advantages as display devices, and are presently being contemplated for use in large area displays. For example, the electrochemical reactions relied on in electrochromic devices usually require only small amounts of power while providing relatively large contrast between the bleached and colored state. The small power requirements involved in operating electrochromic devices limit complications in contemplated circuitry design for large scale arrays. Additionally, since electrochromics rely on electrically induced chemical changes, such devices usually exhibit memory. That is, once a chemical change is initiated by an appropriate electrical signal, the induced chemical state with a different coloration than the initial state is typically very stable under open circuit conditions. The color does not change until a suitable electrical impulse is supplied which reverses the chemical reaction. This memory property is often essential for many applications such as indicator displays.

The stability provided by an electrically induced chemical reaction, at least a priori, also offers the possibility of long term reliability. However, secondary effects often defeat this inherent long term stability. A common electrically induced reaction undergone by electrochromic materials having an oxidation state $M^n$ is represented by the equation $$M^n + e^- + A^+ \rightarrow A^+ M^{n-1}$$

A device based on an electrochromic of this type requires an electrode to supply electrons to the electrochromic and a second electrode to supply a positive charge in the form of an ion, $A^+$. One configuration of electrochromic device depending on this reaction mechanism utilizes solid electrodes immersed in a liquid electrolyte which acts as the electrochromic material. (See for example *IEEE Trans. Electron Devices* ED-22 (9), 749 (1975) disclosing the use of polytungsten anion as the electrolyte/electrochromic). The use of voltages above approximately 1.5 V are often necessary to yield suitable response times and in these cells can cause extensive electrolysis of the water with associated gas evolution. This side reaction generally causes serious packaging and stability problems in the finished device. Additionally, since the electrochromic is a liquid, the ions which undergo the color change easily migrate away from the electrode where coloration is induced. This migration during the interval between coloration and bleaching extends the bleaching response by the time necessary for return of these ions to the appropriate electrode.

Another secondary effect involves corrosion of the electrochromic material in devices which employ a separate solid electrochromic, and a liquid electrolyte. For example, devices with tungsten bronzes generally have a sulfuric acid electrolyte as a source of ions. The acidic electrolyte dissolves the tungsten bronze electrochromic material and ultimately causes failure of the cell.

The use of an all solid state device is being investigated in an attempt to eliminate or minimize the problems associated with devices having liquid components while retaining the advantageous properties potentially offered by electrochromics. Although solid state electrochromic devices have potentially significant advantages, many complications introduced by utilizing solids have not yet been overcome. For example, phosphotungstic acid (PWA) has been reported in display devices employing liquid electrolytes. See D. P. Hamblen, *Research Disclosure*, November 1977, pp. 58–59 No. 16347. However, investigations concerning the electrical properties of solid phosphotungstic acid (PWA)—in a context outside display technology—indicate that solid PWA spontaneously colors when contacted with metals—common sources of ions—(see O. Nakamura et al, Chubu Subsection Autumn Meeting at Nagoya University (1975)) and thus, cannot be used in an electrochromic configuration which relies on the reaction occurring only when a potential is introduced.

Other problems also can arise from the use of solids in a device. In most solid electrochromic devices an intermediary ionic conductor must be introduced between the source of ions and the electrochromic material which is a mixed electronic and ionic conductor. Configurations are utilized which include the successive elements of a first electrode assembly, an electrochromic material, an ionic conductor and a second electrode assembly. The ionic conductor provides conduction path only for ions and not for electrons. After the electrochromic material is colored by injection of electrons from the first electrode assembly, the reverse reaction, bleaching, could not be induced without the presence of the ionic conductor layer. If this layer is absent, during bleaching electrons would be withdrawn through the first electrode assembly but injected through the second electrode assembly. No net change in the colored state of the electrochromic would occur. The ionic conductor prevents injection of electrons from the second electrode assembly and ensures electrons are removed from the electrochromic material during bleaching. Additional layers substantially mitigate the fabrication advantages which might be obtainable in solid state devices.

A solid state device has been produced which does not have the undesirable intermediary layers of the other solid state electrochromic devices. The device utilizes between two metal electrodes a layer of $SrTiO_3$ which is doped with electrochromic entities such as Mo and Ni to concentrations in the range of $10^{17}$ cm$^{-3}$ to $10^{19}$ cm$^{-3}$. (See *Phys. Rev.* B4, 3548 (1971)). These dopants undergo an electrically induced coloration. The cell must also be operated at temperatures above 200 degrees C. and at high voltages to obtain sufficient ionic conductivity through the doped $SrTiO_3$. The necessity of high temperature and voltage operation makes practical applications of this device difficult.

The inherent limitations involved in devices utilizing a liquid medium have not been solved. Attempts to produce an all-solid-state device and maintain the desirable properties of these devices generally have been unsatisfactory.

SUMMARY OF THE INVENTION

Ionic conductors having mobile group I atoms, including protons, e.g., heteropoly acids such as PWA or phosphomolybdic acid (PMA), and which are also electrochromic materials are employed in solid state electrochromic devices. These devices require only a first electrode which is a source of electrons, a second electrode material which maintains charge neutrality in the device by providing protons or other cationic species and the electrochromic material. The solid electrochromics depend for their exceptional properties on very high ionic conductivity with its associated low electronic conductivity and on the ability to color without the addition of a dopant. No interposed ionic conductors or mixed electronic/ionic conductors are necessary. The devices operate on low voltages, e.g., 0.5 to 2.0 V., exhibit suitable memory and stability properties and operate at room temperature. Additionally, excellent reproducible response times, as low as 10 msec., and cycle times of 0.5 to 10 cycles per second are achievable.

The inventive devices exhibit high contrast color changes which are observable under normal lighting conditions. For example, phosphotungstic acid (PWA) changes from a white to a dark blue coloration when an appropriate potential is applied.

BRIEF DESCRIPTION OF THE DRAWING

The FIGURE is a schematic representation of a possible configuration for the subject devices.

DETAILED DESCRIPTION

In a preferred configuration, a transparent first electrode, which is a source of electrons, is used. This electrode is placed in intimate contact with an electrochromic material, e.g., an heteropoly acid. A second electrode, which maintains charge neutrality in the device, is then also placed in intimate contact with the electrochromic material. Fabrication in the preferred embodiment is expediently achieved by first depositing a thin, conductive transparent film, (1) in the FIGURE e.g., a $SnO_2$ film, on a transparent substrate, 6, such as a glass slide. (Other semitransparent, i.e., thin, films of nonreactive materials such as Au or Pt are also useful for this conductive transparent film). A hollow ceramic or glass cylindrical tube, 7, is sealed with epoxy on top of the $SnO_2$ coating. (Some $SnO_2$ is allowed to project beyond the ceramic tube for ease of making electric contact.) The tube is filled to about 1 mm thickness with the solid electrochromic material, 2, and a second electrode, 3, which provides a means for maintaining charge neutrality, is placed upon the solid electrochromic material. Contact is made to the second electrode by conventional means such as with a carbon rod, 8. The device is sealed with a convenient sealant such as epoxy, 10. Contact is made to the first electrode by conventional means such as a pressure contact. The device is then colored by applying a voltage between the electrodes such that the electrode which is the source of electrons, e.g., $SnO_2$ during coloration is negatively charged. Reversing the bias of the electrodes produces bleaching, e.g., from blue to white for PWA and from dark green to orange for phosphomolybdic acid (PMA).

Other configurations are also possible. For example, a thin layer of the electrochromic material is placed on a transparent conductive first electrode and is compressed. A second electrode of a mesh material such as carbon mesh, is then placed on the electrochromic material. The transparent surface is illuminated with light having a wavelength which is absorbed by the electrochromic material when it is in its colored state. Thus, when the electrochromic material is bleached, the light shines through it, shines through the mesh electrode, and is observable as light transmitted through the cell. When the electrochromic material is colored, the light is totally absorbed and the cell appears dark.

The subject devices do not need the intermediary layer generally required by solid electrochromic devices, and operate at room temperature and low voltage if the electrochromic material is chosen to have a particular set of properties. First, the material must be a very good ionic conductor (a poor electronic conductor). This requirement is only satisfied if the material has an electronic transference number at temperatures in the vicinity of room temperature less than $10^{-3}$ preferably less than $10^{-6}$. (The electronic transference number is the ratio of charge carried by electrons to total charge carried in the material. Similarly the ionic transference number is the ratio of charge carried by ions to total charge carried and when added to the electron transference number gives unity.) Further, to insure that the ions are sufficiently mobile to produce adequate response and bleaching times, electrochromic materials having group I ions (group I as used herein includes protons) and the charge carrier are necessary. The materials must also contain a color center such as a transition metal which produces a color change when an appropriate potential is applied. This color center must be a constituent element i.e., a chemically bound element of the electrochromic and not a dopant. Electrons injected into such materials essentially do not migrate from the first electrode during the usual coloration interval. For example, an intense coloration is produced within the first 500 A of PWA adjacent to the first electrode using an injected charge on the order of 1 millicoloumb per square cm of electrode visible area, i.e., of the electrochromic material. This intense coloration is produced by a process such as a valence change of one entity in the electrochromic material, e.g., $W^{+6} \rightarrow W^{+5}$. This allows the use of thin layers of the electrochromic material. The possibility of using thin layers is also attractive in the design of contemplated display arrays.

The ionic resistivity, is also an important property of the electrochromic material which significantly affects the device design parameters, i.e., the potential which must be applied to the electrodes to produce a desired cycle time and reflectivity change between bleached and colored states. The greater the desired reflectivity change from the colored to the bleached state, the greater the amount of current which must flow through the device. That is, each electron injected into the electrochromic material produces a corresponding chemical change in the electrochromic material. The more extensive the chemical change, the greater the change in reflectivity or transmission i.e., the greater the change in optical properties. Generally, perceivable reflectivity changes in the visible light spectrum in the range 5 to 100%, preferably 20 to 100% are required to produce noticeable color changes under average lighting conditions. These changes are induced when a charge of approximately 0.15 to 3 $mC/cm^2$, preferably 0.6 to 3 $mC/cm^2$, is injected into the electrochromic material. The injected charge equals the product of the current injected into the electrochromic material and the time taken to inject it, i.e., the response time of the device. (This assumes current is constant with time. Although this is not strictly true because of the counter EMF produced in the material by charge injected from both electrodes and other time dependent effects it is an adequate assumption for choosing an appropriate material.) For example, if a reflectivity change of 30% corresponding to a charge flow of 1 mC/cm$^2$ is desired for a response time of 50 msec., an average current of 20 mA/cm$^2$ amperes must be injected into the electrochromic material.

The current, which limits the cycle time and coloration is proportional to the voltage impressed on the electrode divided by the resistance of the device. Potentials less than that which cause electrolysis of the waters of hydration (if such waters are present) are desirable. Typical potentials, circa 0.5 to 2.0 V, suitable cycles times, e.g., 0.10 sec to several seconds and observable reflectivity changes, e.g., 20% to 60%, require cell ionic resistances less than 2000 ohms preferably less than 1000 ohms. (These resistances are for the entire device including the electrodes. It is understood that the resistance of the electrodes and the means for applying the potential to the electrodes, e.g., wire leads, must be added to the desired resistance to determine a suitable resistance for the electrochromic material. This additional resistance is however, usually quite small. Thus the electrochromic chosen should generally have the indicated resistance when used in the device. However, the resistance of the contact between the electrochromic and the electrodes is usually significant and must be included in determining appropriate values for the electrochromic.) The resistance of the electrochromic material is equal to the resistivity of the electrochromic material multiplied by the thickness and divided by the area of the material in the device. On this basis for typical device configurations and contact resistances the electrochromic material should have a resistivity less than $2 \times 10^4$ ohm-cm, preferably less than $2 \times 10^3$ ohm-cm. (Such resistivities are measured by standard A. C. techniques (I. D. Raistrick et al, *J. Electrochemical Society*, 123, 1469 (1976)) to determine the practicability of a particular electrochromic material.)

Exemplary of electrochromic materials which are suitable are heteropolyacids, e.g., PWA and PMA, which have a mobile group I ion (this includes mobile protons), an electrochromic entity, a low electronic transference number and a low ionic resistivity—as defined above. Heteropoly acids are materials which have a polymeric matrix including a transition metal oxide and at least one other oxide forming element. In the solid state, these heteropoly acids are generally polycrystalline and have various stoichiometries. These stoichiometries include different ratios of the constituent radicals, e.g., different ratios of $H_3PO_4$ to $WO_3$ or $MoO_3$, and different amount of waters of hydration. The amount of waters of hydration in the acid, and to a lesser extent, the stoichiometric ratio, determines the resistivity of the acid. Thus to an extent, for a particular heteropoly acid the stoichiometry and waters of hydration is adjustable to yield a desired resistivity. (If an electrochromic material is used which has waters of hydration, it is advantageous to encapsulate the device to avoid change in the waters of hydration during operation).

It is possible to use various materials as a constituent element of the second electrode. These materials must provide a mechanism for neutralizing the charge introduced into the electrochromic material during coloration by injection of electrons from the first electrode. Two classes of materials exemplify suitable materials. The first class of materials are those which dissolve as a cation into the electrochromic material. These cations remain near the surface while the mobile specie in the electrochromic, e.g., protons, migrate through the electrochromic to the site of the negative charge produced by the injected electrons. Elemental materials such as copper or silver are useful and come within this class of electrode materials. Additionally compounds such as non-stoichiometric binaries and ternaries which contain elements that dissolve in the electrochromic on application of a potential, e.g., $H_xWO_3$, $Li_xCr_yV_{1-y}Se_2$, $Ag_{2-x}Se$, and $Cu_{2-x}Se$ are also useful. The dissolving element is respectively $H^+$, $Li^+$, $Ag^+$, and $Cu^+$. These compositions are particularly important if the element, e.g., Li, is too reactive to be used individually.

A second class of electrode materials includes (a) elements which form oxides such as tungsten and molybdenum and further includes (b) non-reactive compositions such as carbon. A contemplated explanation for the neutralization mechanism occurring when oxide formers are employed is either that the material e.g., tungsten, itself dissolves in the electrochromic material or that species such as W—OH on the surface of the oxide former give up $H^+$ to the electrochromic to neutralize the injected charge. A contemplated explanation for nonreactive materials is that the surface of these materials have hydroxyls (C-OH) which provide $H^+$ to the electrochromic material. For example, in the case of graphite hydroquinones formed on the surface in the presence of an applied field give up $H^+$ to the electrochromic and convert to quinones.

Generally the electrode material must not excessively react with the electrochromic material in the absence of an applied electric field. Some heteropolyacids do react with electrode materials such as silver. For example, when silver contacts PWA some auto-coloration occurs at the second electrode. However, the extent of auto-coloration is quite limited and is not significant for most device configurations. (It should be noted that auto-coloration is totally avoided with non-reactive electrode materials, such as graphite or with nonstoichiometric materials such as $Ag_{2-x}Se$.) Previous reports of extensive auto coloration, it is believed, stem from incomplete purification of the materials after synthesis. For example, if no purification and recrystallization is performed after PWA is synthesized by the method described in H. Wu, *J. Biological Chemistry*, 43, p. 189 (1920), all the contacted PWA immediately colors when contacted with copper. However, if the PWA is recrystallized, metals such as copper and silver do not extensively produce coloration in the absence of an electrical impulse.

Additionally, some electrochromic materials undergo desirable color changes e.g., PMA color from orange to green, but are difficult or impossible to bleach. It is possible to enhance bleaching or prevent auto-coloration, when it is a problem, by combining various electrochromic materials. For example, PMA does not satisfactorily bleach when an Ag electrode is used. However, if 10–20 wt percent $Na_2MoO_4$ is added to the $Na_2WO_4$ and the prescription of Wu, supra, is followed, the resulting Mo and W containing heteropolyacid is yellow in the bleached state but has a bleaching performance with an Ag electrode comparable to PWA.

It is also possible to influence the color of the bleached electrochromic material by adding additional chemically bond oxide forming entities. For example, PWA is white in the bleached state. However, if phosphotungstic vanadic acid is prepared by adding about 20% by weight $Na_3VO_4$ to the original $Na_2WO_4$ composition described in the paper by Wu, supra, the bleached color of the material is red. It should be noted that the vanadium is not a dopant but a chemically bound substituent of the electrochromic material. Further, the vanadium is used to affect the color of the bleached state rather than, as a dopant, used to produce a colored state.

In the preferred embodiment, the device is built on a transparent substrate. This substrate is coated with a film of a conductive transparent material, e.g., $SnO_2$ which is a source of electrons. This base electrode, in the preferred configuration, should be inert to the electrochromic material, be transparent to visible light, i.e., absorb less than 50% of the incident light and be an electron conductor, i.e., having a sheet resistance less than 100 ohms per square.

Electrical contact between the electrode which is a source of electrons and the electrochromic material is made through conventional techniques such as by a physical contact. However, to decrease the resistivity of the contact, and of the electrochromic itself, it is desirable to compress it against the transparent electrode film. When the cell is built utilizing a ceramic cylindrical body to contain the said electrochromic, compression is achieved by using a press having a piston which fits into the cylinder. Pressures of up to 5,000 psi to achieve compression yield acceptable results when a glass substrate is utilized. Other less fragile ceramics or other less fragile substrates allow higher compressive forces. Contact to the second electrode is also made by conventional methods such as a pressure contact between a carbon rod and the second electrode.

We claim:

1. A device comprising, (1) a solid electrochromic material, (2) a first and second electrode, said electrodes being in intimate contact with said electrochromic material and having means for applying an electric potential between said electrodes, (3) means for making electromagnetic radiation incident on said electrochromic material, and (4) means for observing an optical modification in said electrochromic material resulting from imposition of said electric potential CHARACTERIZED IN THAT said solid electrochromic material, (1) has a charge carrier from group I of the Mendelevian periodic table, (2) has an electronic transference number at room temperature less than $10^{-3}$, (3) has a resistivity less than $2 \times 10^4$ ohm-cm, (4) has a chemically bound constituent which undergoes an electrically induced coloration, and (5) comprises a polyhetero acid; whereby when a potential is applied between said first and second electrode an optical change is produced in said electrochromic material.

2. The device of claim 1 wherein said electrochromic material comprises a polyphosphoric acid chosen from the group consisting of polyphosphotungstic and polyphosphomolybdic acids.

3. The device of claim 1 wherein said first electrode is $SnO_2$.

4. The device of claim 1 wherein said second electrode contains a mobile species derived from a member of the group consisting of Cu, Ag, Li and H.

5. The device of claim 1 wherein said electrochromic material is compressed onto said first electrode.

6. The device of claim 1 wherein said second electrode is carbon.

7. The device of claim 1 wherein the means for applying an electric potential to said second electrode is a carbon rod.

8. The device of claim 1 wherein said solid electrochromic material contains a bound species derived from a member of the group consisting of tungsten and molybdenum.

9. The device of claim 1 wherein said means for making electromagnetic radiation incident on said electrochromic material is a transparent first electrode.

10. The device of claim 1 wherein said means for observing an optical modification in said electrochromic material is a transparent first electrode.

* * * * *

UNITED STATES PATENT AND TRADEMARK OFFICE
CERTIFICATE OF CORRECTION

PATENT NO. : 4,298,250

DATED : November 3, 1981

INVENTOR(S) : Gary D. Boyd, Sarat K. Mohapatra, Benjamin Tell, Sigurd Wagner, and Fred Wudl It is certified that error appears in the above—identified patent and that said Letters Patent is hereby corrected as shown below:

Column 4, line 22, "and" should read --as--; line 31, "A" should read --$\overset{\circ}{A}$--. Column 5, line 50, "amount" should read --amounts--.

Signed and Sealed this

Thirtieth Day of March 1982

[SEAL]

Attest:

GERALD J. MOSSINGHOFF

Attesting Officer     Commissioner of Patents and Trademarks